(12) United States Patent
Pande et al.

(10) Patent No.: US 11,429,369 B2
(45) Date of Patent: Aug. 30, 2022

(54) DISTRIBUTED UPGRADE IN VIRTUALIZED COMPUTING ENVIRONMENTS

(71) Applicant: VMware, Inc., Palo Alto, CA (US)

(72) Inventors: Ajay Pande, Pune (IN); Prashant Shelke, Pune (IN); Avinash Bhattarmakki, Pune (IN)

(73) Assignee: VMWARE, INC., Palo Alto, CA (US)

( * ) Notice: Subject to any disclaimer, the term of this patent is extended or adjusted under 35 U.S.C. 154(b) by 39 days.

(21) Appl. No.: 16/773,926

(22) Filed: Jan. 27, 2020

(65) Prior Publication Data

US 2020/0159520 A1 May 21, 2020

Related U.S. Application Data

(63) Continuation of application No. 15/832,785, filed on Dec. 6, 2017, now Pat. No. 10,545,750.

(51) Int. Cl.
| | | |
|---|---|---|
| *G06F 9/44* | (2018.01) | |
| *G06F 8/65* | (2018.01) | |
| *G06F 9/455* | (2018.01) | |
| *H04L 41/082* | (2022.01) | |
| *H04L 67/10* | (2022.01) | |
| *H04L 41/046* | (2022.01) | |
| *H04L 43/10* | (2022.01) | |

(52) U.S. Cl.
CPC ............ *G06F 8/65* (2013.01); *G06F 9/45558* (2013.01); *H04L 41/046* (2013.01); *H04L 41/082* (2013.01); *H04L 43/10* (2013.01); *H04L 67/10* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,415,317 B1* | 7/2002 | Yelon | A63F 13/12 709/205 |
| 6,938,021 B2* | 8/2005 | Shear | G06Q 20/3674 705/67 |
| 9,760,597 B2* | 9/2017 | Jimenez Peris | G06F 16/2365 |
| 2011/0225574 A1* | 9/2011 | Khalidi | G06F 8/656 717/168 |
| 2014/0236921 A1* | 8/2014 | Belknap | G06F 16/24545 707/718 |
| 2016/0127440 A1* | 5/2016 | Gordon | H04N 21/23439 709/219 |
| 2018/0241617 A1* | 8/2018 | Radzikowski | G06F 8/656 |
| 2019/0058631 A1* | 2/2019 | Zhou | H04L 41/0836 |

(Continued)

OTHER PUBLICATIONS

VMware, "NSX-T Upgrade Guide", VMware NSX-T 2.0, Sep. 7, 2017.

*Primary Examiner* — Anna C Deng
(74) *Attorney, Agent, or Firm* — Su IP Consulting

(57) ABSTRACT

Example methods and systems to perform distributed upgrade of a component of a data plane are disclosed. One method may include collecting information associated with all the components, preparing a upgrade plan by associating a first set of tasks of the upgrade plan with a first manager and a second set of tasks of the upgrade plan with a second manager based on the collected information, and distributing the first set of tasks to a first upgrade coordinator of the first manager and the second set of tasks to a second upgrade coordinator of the second manager.

12 Claims, 6 Drawing Sheets

(56) References Cited

U.S. PATENT DOCUMENTS

2019/0158423 A1\* 5/2019 Li .................... H04L 43/0817
2019/0171435 A1   6/2019 Pande et al.
2019/0384651 A1\* 12/2019 Newburn ................ G06F 9/54

\* cited by examiner

DISTRIBUTED UPGRADE IN VIRTUALIZED COMPUTING ENVIRONMENTS

CROSS-REFERENCE TO RELATED APPLICATION

This application is a continuation under 35 U.S.C. § 120 of U.S. patent application Ser. No. 15/832,785, filed Dec. 6, 2017, which is incorporated by reference in its entirety.

BACKGROUND

Unless otherwise indicated herein, the approaches described in this section are not admitted to be prior art by inclusion in this section.

Virtualization allows the abstraction and pooling of hardware resources to support virtual appliances in a virtualized computing environment. For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software defined networking, benefits similar to server virtualization may be derived for networking services. For example, logical overlay networks may include various components and be provided that are decoupled from the underlying physical network infrastructure, and therefore may be provisioned, changed, stored, deleted and restored programmatically without having to reconfigure the underlying physical hardware. In a logical overlay network with hundreds or thousands of components, it can be challenging to effectively upgrade all components, which may in turn result in operational difficulties and/or increased security risks.

DETAILED DESCRIPTION

Figure 1:
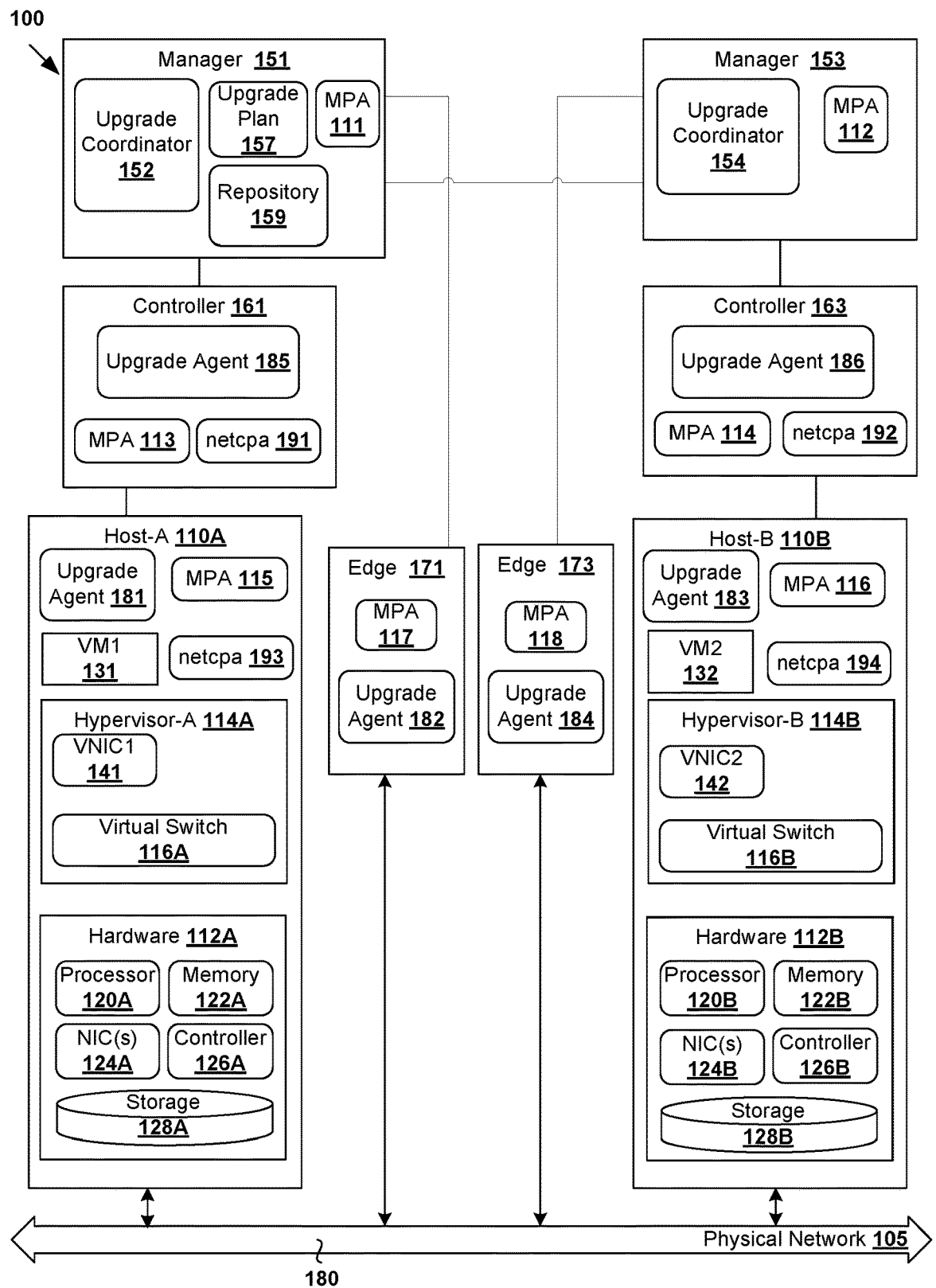
FIG. 1 is a schematic diagram illustrating an example virtualized computing environment in which a distributed upgrade may be implemented.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example virtualized computing environment 100 in which a distributed upgrade may be implemented. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A and host-B 110B that are connected via physical network 105. Each host 110A/110B includes suitable hardware 112A/112B and virtualization software (e.g., hypervisor-A 114A and hypervisor-B 114B) to support virtual machines (e.g., VM1 131 and VM2 132). For example, host-A 110A supports VM1 131; and host-B 110B supports VM2 132. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B maintains a mapping between underlying hardware 112A/112B and virtual resources allocated to respective virtual machines 131-132. Hardware 112A/112B includes suitable physical components, such as central processing unit(s) or processor(s) 120A/120B; memory 122A/122B; physical network interface controllers 124A/124B; and storage disk(s) 128A/128B accessible via storage controller(s) 126A/126B, etc. To support guest operating systems and applications, virtual resources are allocated to the virtual machines. For example, corresponding to hardware 112A/112B, the virtual resources may include virtual CPU, virtual memory, virtual disk, virtual network interface controller (VNIC), etc. In the example in FIG. 1, VM1 131 and VM2 132 are associated with respective VNIC1 141 and VNIC2 142. Although one-to-one relationships are shown, one virtual machine may be associated with multiple VNICs (each VNIC having its own network address) in practice.

Hypervisor 114A/114B implements virtual switch 116A/116B to forward egress packets (i.e., outgoing or outbound) from, and ingress packets (i.e., incoming or inbound) to, the virtual machines. As used herein, the term "packet" may refer generally to a group of bits that can be transported together from a source to a destination, such as segment, frame, message, datagram, etc. Also, the term "layer 2" may refer generally to a Media Access Control (MAC) layer; and "layer 3" to a network or Internet Protocol (IP) layer in the Open System Interconnection (OSI) model, although the concepts described herein may be used with other networking models. Physical network 105 may include any suitable number of interconnected physical network devices, such as routers, switches, etc.

Managers 151, 153, controllers 161, 163 and edges 171, 173 are components that facilitate implementation of software defined (e.g., logical overlay) networks in virtualized computing environment 100. Through network virtualization, logical overlay networks may be provisioned, changed, stored, deleted and restored programmatically without having to reconfigure the underlying physical hardware. A logical overlay network may be formed using any suitable protocol, such as Virtual Local Area Network (VLAN), Virtual eXtensible Local Area Network (VXLAN), Stateless Transport Tunneling (STT), Generic Network Virtualization Encapsulation (GENEVE), etc.

In some embodiments, an example logical overlay network may be implemented with an architecture having been built-in separation of a management plane, a control plane, and a data plane. The management plane provides secure concurrent entry points to the example logical overlay network via a graphical user interface. The control plane is configured to track of the real-time virtual networking and security state of the logical overlay network. The data plane implements a number of capability to improve the performance and resiliency of the example logical overlay network. In some embodiments, the management plane includes managers 151 and 153, the control plane includes controllers 161 and 163 and the data plane includes hosts 110A and 110B and edges 171 and 173.

Managers 151 and 153 may serve as an entry point for Representational State Transfer (REST) Application Programming Interface (API) for NSX, which facilitates automate deployment and management of components in the example logical overlay network. Some example components in the example logical overlay network include, but not limited to, controllers 161 and 163, edges 171 and 173 and hosts 110A and 110B. One example of managers 151 and 153 is the NSX manager component of VMware NSX® (available from VMware, Inc.) that operates on a management plane. Managers 151/153 may be implemented using physical machine(s), virtual machine(s), or both. Managers 151 and 153 may run management plane agent (MPA) 111 and 112, respectively. MPA 111 and 112 are configured to persist the state of virtualized computing environment 100 and communicate non-flow-controlling messages such as configurations, statistics, status and real time data among MPA 113 and 114 on controller 161 and 163, MPA 115 and 116 on hosts 110A and 110B, and MPA 117 and 118 on edges 171 and 173.

Controllers 161 and 163 may be members of a controller cluster (not shown for simplicity) that is configurable using managers 151 and 153, respectively. One example of controllers 161 and 163 is the NSX controller component of VMware NSX® that operates on a central control plane. Controllers 161/163 may be implemented using physical machine(s), virtual machine(s), or both. Controllers 161 and 163 may run control plane agent (netcpa) 191 and 192 to monitor the communications between controllers 161/163 and hosts 110A/110B. Similarly, hosts 110A and 110B also run netcpa 193 and 194 to validate the connections from hosts 110A/110B to controllers 161/163.

Edges 171 and 173 are configured to provide network edge security and gateway services in the example logical overlay network. One example of edge 171 and 173 is the NSX Edge component of VMware NSX® that operates on a data plane. In some embodiments, edges 171 and 173 may provide logical services in the example logical overlay network. Some example logical services include, but not limited to, routing, network address translation, firewall, load balancing, L2 and L3 virtual private networks, and dynamic host configuration protocol (DHCP), domain name system (DNS) and internet protocol (IP) address managements.

Components (managers 151/153, controllers 161/163, edges 171/173 and hosts 110A/110B) in the logical overlay network may be upgraded. Conventionally, during the upgrade, an administrator needs uploading an upgrade bundle to manager 151 and triggering and monitoring the upgrade progress of hosts 110A/110B, edges 171/173, controllers 161/163 and managers 151/153. Conventionally, only one single upgrade coordinator (i.e., upgrade coordinator 152) is used for the upgrades of all components in virtualized computing environment 100. It becomes challenging for upgrade coordinator 152 in a multi-tenant data center with hundreds or thousands of clusters of appliances and workload hosts.

In some embodiments, manager 151 is configured as a master manager. In some embodiments, master manager 151 includes repository 159 to which an upgrade bundle is uploaded to master manager 151. Other manager (e.g., manager 153) in the example overlay logical network may be configured as slave managers which are coordinated by master manager 151.

In some embodiments, master manager 151 runs upgrade coordinator 152 which is a self-contained Web application that orchestrates the upgrade process of different components in the example overlay logical network. In some embodiments, master manager 151 is configured to get a list of all components in virtualized computing environment 100. Based on the list, upgrade coordinator 152 is configured to generate distributed upgrade plan 157 for all components (e.g., manager 151/153, controller 161/163, edge 171/173 and host 110A/110B). In some embodiments, distributed upgrade plan 157 lists out the tasks and the orders to carry out. Upgrade coordinator 152 may distribute tasks in upgrade plan 157 to upgrade coordinator 154 on slave manager 153. In some embodiments, hosts 110A/110B edges 171/173, controllers 161/163 and managers 151/153 are upgraded in sequence.

More specifically, in some embodiments, according to upgrade plan 157, upgrade coordinator 152 may distribute upgrade tasks of hosts 110A/110B to other upgrade coordinators (e.g., upgrade coordinator 154) that reside on other managers (e.g., manager 153) to complete the upgrades of hosts 110A/110B. After hosts 110A/110B are upgraded, upgrade coordinator 152 may distribute upgrade tasks of edges 171/173 to upgrade coordinators 152/154 to complete the upgrades of edges 171/173. Similarly, after edges 171/173 are upgraded, upgrade coordinator 152 may distribute upgrade tasks of controllers 161/163 to upgrade coordinators 152/154 to complete the upgrades of controllers 161/163. Finally, after controllers 161/163 are upgraded, upgrade coordinator 152 may distribute upgrade tasks of managers 151/153 to upgrade coordinators 152/154 to complete the upgrades of controllers 151/153.

In some embodiments, upgrade coordinators 152 and 154 are configured to work with upgrade agents 181/183 to upgrade hosts 110A/110B, upgrade agents 182/184 to upgrade edges 171/173 and upgrade agents 185/186 to upgrade controllers 161/163. In some embodiments, upgrade agents 181-186 are configured to receive commands from upgrade coordinators 152 and 154 to download the upgrade bundle from repository 159, process the upgrade bundle and upgrade hosts 110A/110B, edges 171/173 and controllers 161/163 according to the upgrade bundle.

Figure 2:
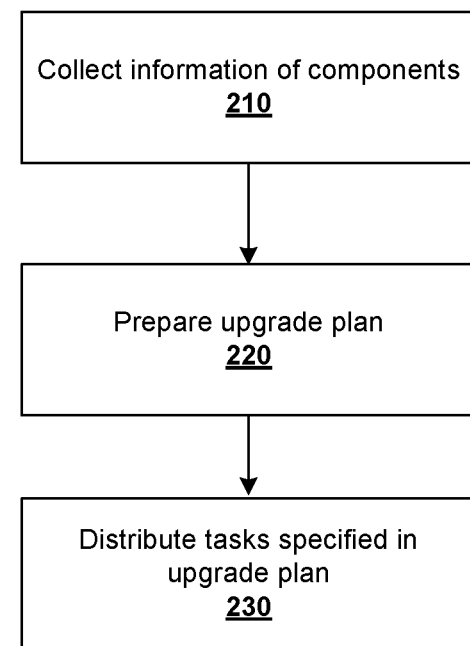
FIG. 2 is a flowchart of an example process of a master management node to perform a distributed upgrade in a virtualized computing environment.

FIG. 2 is a flowchart of an example process 200 of a master management node to perform a distributed upgrade in a virtualized computing environment. Example process 200 may include one or more operations, functions, or actions illustrated by one or more blocks, such as 210 to 230. The various blocks may be combined into fewer blocks, divided into additional blocks, and/or eliminated depending on the desired implementation. In practice, example process 200 may be performed by a master management node in a virtualized computing environment. One example management node may correspond to master manager 151 in FIG. 1.

At 210 in FIG. 2, in conjunction with FIG. 1, master manager 151 is configured to collect information associated with all components in virtualized computing environment 100. For example, master manager 151 is configured to generate a list of all components (i.e., managers 151/153, controllers 161/163, edges 171/173 and hosts 110A/110B) in virtualized computing environment 100 based on the collected information. In some embodiments, the information may be collected through communication among MPA 111-118.

At 220 in FIG. 2, in conjunction with FIG. 1, master manager 151 is configured to prepare upgrade plan 157 to upgrade all components in virtualized computing environment 100. Based on information collected at 210, master manager 151 may specify the tasks and the orders to carry out the tasks in upgrade plan 157. For example, upgrade plan 157 may include a first set of tasks to upgrade hosts 110A/110B, a second set of tasks to upgrade edges 171/173, a third set of tasks to upgrade controllers 161/163 and a fourth set of tasks to upgrade managers 151/153. In some embodiments, upgrade plan 157 may include an order of carrying out the first set of tasks, the second set of tasks, the third set of tasks and the fourth set of tasks in sequence.

At 230 in FIG. 2, in conjunction with FIG. 1, master manager 151 is configured to distribute the tasks specified in upgrade plan 157 (prepared at 220) among various managers (e.g., managers 151 and 153) that run on the management plane of the example overlay logical network. In some embodiments, master manager 151 may associate some tasks with a specific manager in upgrade plan 157 to distribute the tasks among managers 151/153. In some embodiments, the association may be based on the workloads and capabilities of the managers 151/153. For example, in response to master manager 151 having less workloads and higher capabilities, more tasks may be associated with master manager 151, and less tasks may be associated with slave manager 153, or vice versa.

For example, master manager 151 may associate a fifth set of tasks to upgrade host-A 110A, edge 171, controller 161 and master manager 151 with master manager 151, and a sixth set of tasks to upgrade host-B 110B, edge 173, controller 163 and manager 153 with slave manager 153. In some embodiments, managers 151 and 153 may communicate with each other via REST new API channel so that master manager 151 may distribute the fifth and the sixth sets of tasks among master manager 151 and slave manager 153. In some embodiments, in response to the association of the fifth set of tasks and master manager 151, upgrade coordinator 152 on master manager 151 is upgraded so that upgrade coordinator 152 is configured to distribute the fifth set of tasks to upgrade coordinator 152 and the sixth set of tasks to upgrade coordinator 154. In some embodiments, in response to the distributed fifth set of tasks, upgrade coordinator 152 is configured to orchestrate the upgrade process of host-A 110A, edge 171, controller 161 and master manager 151. Similarly, in response to the distributed sixth set of tasks, upgrade coordinator 154 on slave manager 153 is upgraded so that upgrade coordinator 154 is configured to orchestrate the upgrade process of host-B 110B, edge 173, controller 163 and slave manager 153. In some embodiments, upgrade coordinators 152/154 are configured to upgrade themselves, hosts 110A/110B, edges 171/173, controllers 161/163, and managers 151/153 in sequence, respectively.

Figure 3:
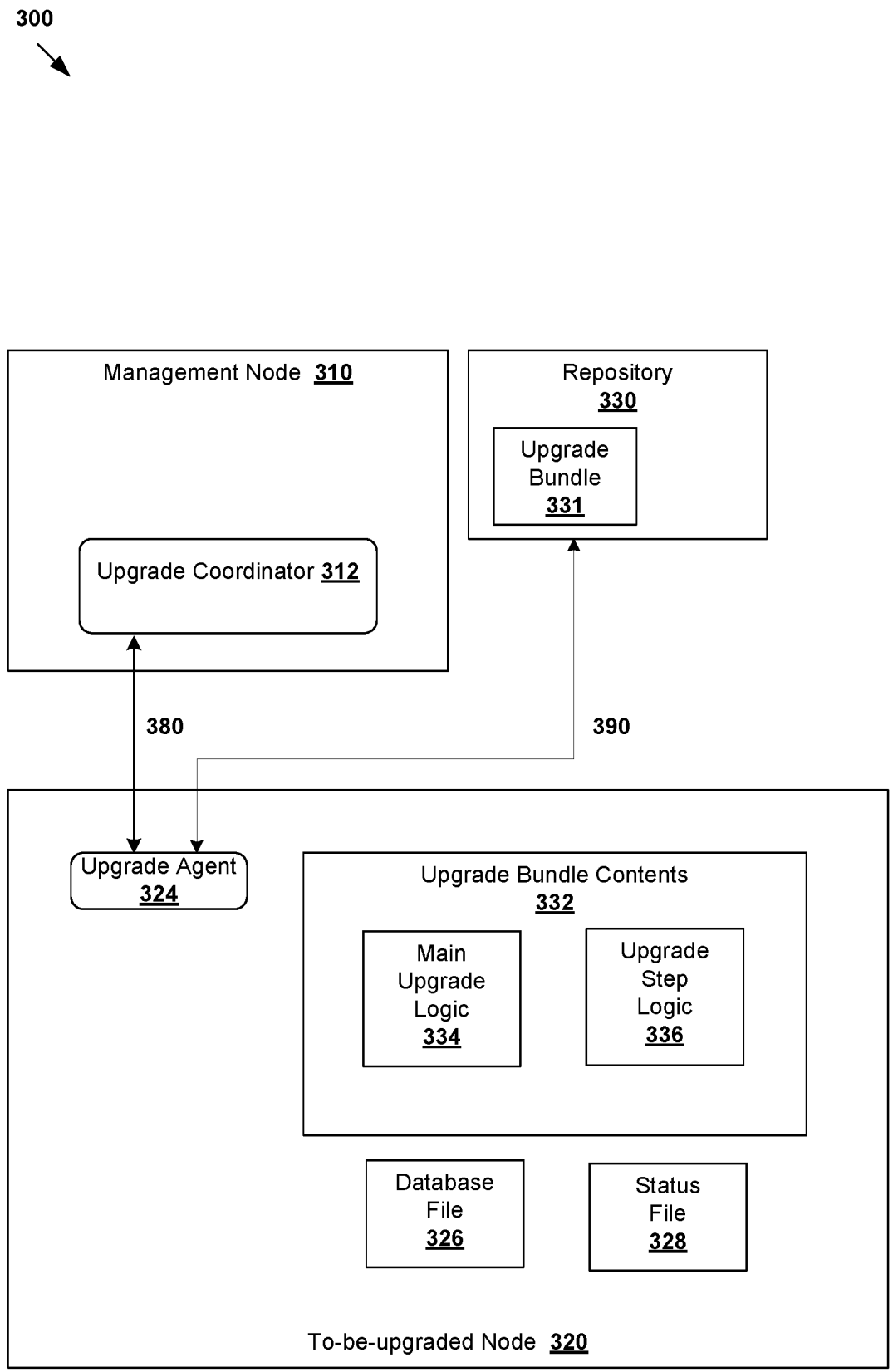
FIG. 3 is a schematic diagram illustrating a distributed upgrade operation involving a management node and one or more to-be-upgraded nodes in a virtualized computing environment.

FIG. 3 is a schematic diagram illustrating a distributed upgrade operation involving management node 310 and to-be-upgraded node 320 in virtualized computing environment 300. Although a single to-be-upgraded node 320 is illustrated for simplicity, those skilled in the art will recognize that two or more to-be-upgraded nodes 320 may exist in virtualized computing environment 300. In some embodiments, in conjunction with FIG. 1, an example management node 310 may correspond to any manager (e.g., managers 151/153) in virtualized computing environment 100. An example to-be-upgraded node 320 may correspond to any component managed by managers 151/153 and to be upgraded (e.g., controllers 161/163, edges 171/173 and hosts 110A/110B) in virtualized computing environment 100.

In some embodiments, virtualized computing environment 300 include repository 330 which stores upgrade bundle 331. Repository 330 may be hosted by management node 310 if management node 310 is a master manager (e.g., master manager 151). However, even management node 310 is a slave manager (e.g., slave manager 153), management node 310 may still instruct to-be-upgraded node 320 to download upgrade bundle 331 from repository 330 hosted by a master manager. In some embodiments, repository 330 is accessible for any components in virtualized computing environment 100 over hypertext transfer protocol.

In some embodiments, management node 310 includes upgrade coordinator 312. In some embodiments, during the upgrade process, upgrade coordinator 312 is configured to establish communication 380 (e.g., through MPA 111-118) between upgrade coordinator 312 and upgrade agent 324 at to-be-upgraded node 320 so that upgrade coordinator 312 may receive the upgrade progress of to-be-upgraded node 320 through communication 380 (e.g., RabbitMQ message between upgrade coordinator 312 and upgrade agent 324).

In some embodiments, upgrade agent 324 may be a multiplexing proxy agent. In response to a command from upgrade coordinator 312, upgrade agent 324 is configured to download upgrade bundle 331 from repository 330 through communication 390. In some embodiments, upgrade bundle 331 may include version upgrade coordinator packages, appliance images, individual upgrade bundles of managers, controllers and edges, and host component bundles. After upgrade bundle 331 is downloaded to to-be-upgraded node 320, upgrade agent 324 may also be configured to verify the authenticity/version of upgrade bundle 331. In addition, upgrade agent 324 may extract upgrade bundle contents 332 from upgrade bundle 331.

In some embodiments, upgrade bundle contents 332 include, but not limited to, main upgrade logic 334 and upgrade step logic 336. In some embodiments, main upgrade logic 334 may be implemented by main upgrade scripts, and upgrade step logic 336 may be implemented by upgrade step scripts. A script may generally refer to a sequence of instructions that can be interpreted or executed in a run-time environment. Main upgrade scripts may include a sequence of instructions corresponding to main upgrade logic 334 to orchestrate the upgrade process on to-be-upgraded node 320. Upgrade step scripts may include a sequence of instructions carried out by upgrade step logic 336 to alter the operations of to-be-upgraded node 320. In some embodiments, such alternation may include one or more upgrade steps of to-be-upgraded node 320 and each upgrade step may include one or more tasks of the upgrade process.

In some embodiments, main upgrade logic 334 may call upgrade step logic 336 to carry out various upgrade steps. In some embodiments, an example upgrade step includes, but not limited to, copying operating system image, configuration files and credentials of to-be-upgraded node 320, saving copied operating system image, configuration files and credentials to a first operating system partition of to-be-upgraded node 320, creating a second operating system partition of to-be-upgraded node 320, installing a new operating system in the second operating system partition, rebooting to-be-upgraded node 320 in the second operating system partition; and/or rebooting to-be-upgraded node 320 in the first operating system partition (if rebooting in the second operating system partition fails).

In some embodiments, any upgrade step may include one or more tasks. Each task may be assigned with one or more task identifiers in response to the real-time status of the task. For example, some task identifies may include, but not limited to, SUCCESS (assigned to a completed task), FAILED (assigned to a failed task), and IN_PROGRESS (assigned to an in-progress task). In addition, in some embodiments, for long-lived upgrade steps, upgrade step logic 336 may report intermediate progress messages by writing such progress to status file 328. In some embodiments, status file 328 is saved locally at to-be-upgraded node 320 and is not a part of upgrade bundle contents 332.

In some embodiments, main upgrade logic 334 may carry out instructions of the main upgrade scripts to monitor the upgrade progress by collecting task identifier information for each task. In some embodiments, in response to FAILED task identifier associated with a specific task, main upgrade logic 334 may call upgrade step logic 336 to repeatedly carry out upgrade step scripts including the specific task and continue to monitor the task identifier of the specific task. In some embodiments, main upgrade logic 334 may stop calling upgrade step logic 336 if task identifiers of all tasks in step scripts associated with the upgrade are SUCCESS. In some embodiments, in response to a critical task with FAILED task identifier, main upgrade logic 334 may pause the upgrade and record the failure of the critical task in database file 326.

In some embodiments, main upgrade logic 334 may carry out the main upgrade scripts to generate database file 326, which stores the collected task identifier information for each task and/or progress information in status file 328. In some embodiments, database file 326 is saved locally at to-be-upgraded node 320 and not a part of upgrade bundle contents 332. In response to queries constantly from upgrade agent 324, main upgrade logic 334 is configured to retrieve and transmit database file 326 to upgrade agent 324. In some embodiments, upgrade agent 324 is configured to transmit database file 326 to upgrade coordinator 312.

Figure 4:
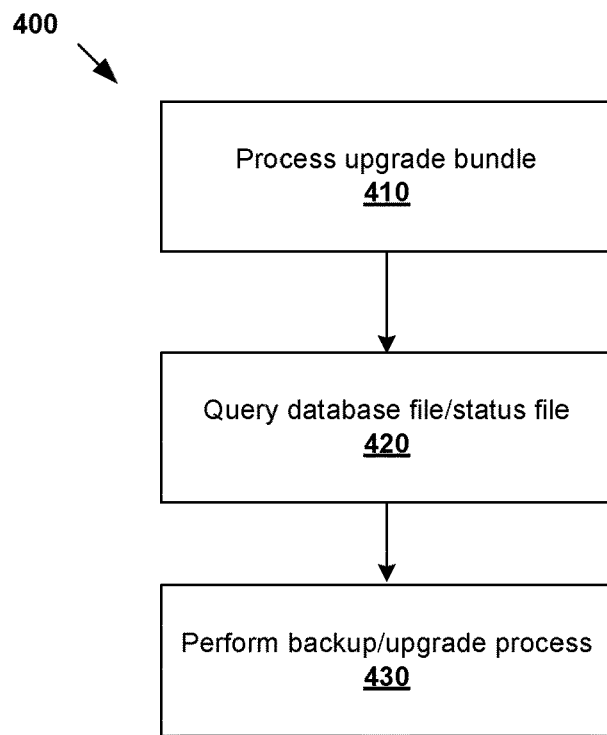
FIG. 4 is a flowchart of an example process to perform distributed upgrade on a to-be-upgraded node.

FIG. 4 is a flowchart of an example process 400 to perform distributed upgrade on a to-be-upgraded node. Example process 400 may include one or more operations, functions, or actions illustrated by one or more blocks, such as 410 to 430. The various blocks may be combined into fewer blocks, divided into additional blocks, and/or eliminated depending on the desired implementation. In practice, example process 400 may be performed by any to-be-upgraded nodes managed by a management node (e.g., managers 151/153) in a virtualized computing environment, such as controllers 161/163, edges 171/173 and hosts 110A/110B in FIG. 1.

At 410 in FIG. 4, in conjunction with FIG. 3, node 320 is configured to process upgrade bundle 331 downloaded from repository 330. In some embodiments, node 320 is in a quiescence mode which is a read-only mode in the upgrade process of node 320. In some embodiments, no writing operations for any configuration or database files that need to be persistent during the upgrade process of node 320 are allowed in the quiescence mode. In some embodiments, node 320 is further configured to, for example, verify authenticity and version of upgrade bundle 331. In some embodiments, further processing of upgrade bundle 331 may be temporarily stopped if the authenticity and/or the version of upgrade bundle 331 cannot be verified. Node 320 may also be configured to extract upgrade bundle contents 332 from upgrade bundle 331. In some embodiments, upgrade bundle contents 332 include main upgrade logic 334 and upgrade step logic 336.

At 420 in FIG. 4, in conjunction with FIG. 3, main upgrade logic 334 is configured to query database file 326 and/or status file 328 to obtain the upgrade progress of to-be-upgraded node 320. In some embodiments, database file 326 is locally saved on to-be-upgraded node 320. One advantage of saving database file 326 on to-be-upgraded node 320 includes performing a failover operation. In some embodiments, the previous upgrade of to-be-upgraded node 320 may not be completed. However, task identifiers of the previous upgrade are saved in database file 326. Therefore, in response to resuming the upgrade process, upgrade agent 324 may re-download upgrade bundle 331 and repeat 410 in FIG. 4. In some embodiments, main upgrade logic 334 (e.g., extracted from re-downloaded upgrade bundle 331) is configured to obtain task identifiers of the previous upgrade and resume the upgrade accordingly (e.g., not executing a task with SUCCESS task identifier and/or re-executing a task with FAILED task identifier).

At 430 in FIG. 4, in conjunction with FIG. 3, main upgrade logic 334 is configured to perform backup/upgrade process according to information (e.g., task identifiers) obtained from querying database file 326 and/or status file 328. The backup/upgrade process will be further described in details below.

Figure 5:
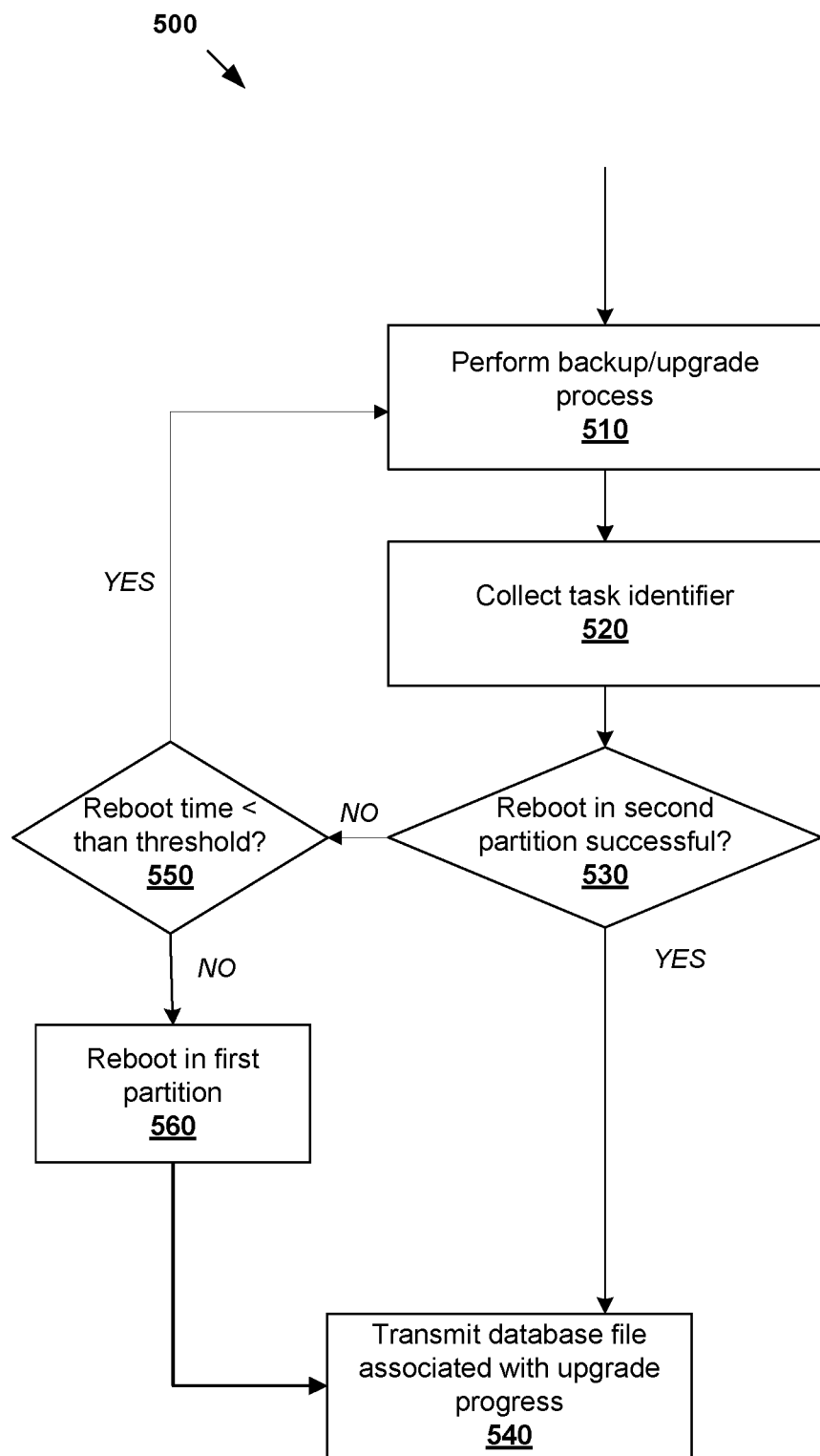
FIG. 5 is a flowchart of an example process to perform distributed upgrade on a to-be-upgraded node.

FIG. 5 is a flowchart of an example process 500 to perform distributed upgrade on a to-be-upgraded node. Example process 500 may include one or more operations, functions, or actions illustrated by one or more blocks, such as 510 to 560. The various blocks may be combined into fewer blocks, divided into additional blocks, and/or eliminated depending on the desired implementation. In practice, example process 500 may be performed by any to-be-upgraded components managed by a manager in a virtualized computing environment, such as controllers 161/163, edges 171/173 and hosts 110A/110B in FIG. 1.

At 510 in FIG. 5, in conjunction with FIG. 4, in some embodiments, 510 may correspond to 430 in FIG. 4. At 510 in FIG. 5, in conjunction with FIG. 3, node 320 is configured to perform upgrade steps associated with a backup process before upgrading node 320. In some embodiments, main upgrade logic 334 may carry out main upgrade scripts to call upgrade step logic 336 to carry out a first set of upgrade step scripts to perform the backup process. The first set of upgrade step scripts may copy current operating system image, configuration files and credentials of node 320. In addition, the first set of upgrade step scripts may save the copied information in an existing first operating system partition of node 320. In some embodiments, node 320 is configured to perform upgrade steps associated with an upgrade process to upgrade node 320. In some embodiments, main upgrade logic 334 may carry out main upgrade scripts to call upgrade step logic 336 to carry out a second set of upgrade set scripts to perform the upgrade process. The second set of upgrade step scripts may create a second operation system partition of node 320, install a new operating system in the second operating system partition, and rebooting node 320 in the second operating system partition.

At 520 in FIG. 5, in conjunction with FIG. 3, main upgrade logic 334 is configured to collect task identifier information for each task. Any upgrade step set forth above may include one or more tasks. In some embodiments, in response to FAILED task identifier associated with a specific task, main upgrade logic 334 may call upgrade step logic 336 to repeatedly carry out upgrade step scripts associated with the specific task and continue to monitor the task identifier of the specific task. In some embodiments, in response to SUCCESS task identifier associated with a specific task, main upgrade logic 334 may continue to call upgrade step logic 336 to carry out upgrade step scripts associated with other tasks and continue to monitor task identifiers of the other tasks. In some embodiments, main upgrade logic 334 is configured to record/update collected task identifiers in database file 326.

At 530 in FIG. 5, in conjunction with FIG. 3, node 320 is configured to check whether rebooting node 320 in the second operating system partition is successful. At 540 in FIG. 5, in response to successfully rebooting node 320 in the second operating system partition, main upgrade logic 334 may retrieve database file 326 for upgrade agent 324 either actively or in response to a query made by upgrade agent 324. In some embodiments, upgrade agent 324 may transmit database file 326 to upgrade coordinator 312 at manager 310.

At 550 in FIG. 5, in conjunction with FIG. 3, in response to unsuccessfully rebooting node 320 in the second operating system partition, the time of rebooting node 320 may be checked. In response to the time less than a threshold, process 500 may be looped back to 510 to re-perform the backup/upgrade process.

In response to the time reaching or exceeding the threshold, process 500 may be followed by 560. At 560 in FIG. 5, in conjunction with FIG. 3, main upgrade logic 334 may call upgrade step logic 336 to carry out upgrade step scripts associated with a rollback operation to reboot node 320 in the first operating system partition with information obtained in backup process at 510. Therefore, in some embodiments, although node 320 fails to reboot in the second operating system partition, node 320 is still capable of providing services in virtualized computing environment 300 after rebooting in the first operating system partition.

At 540 in FIG. 5, in conjunction with FIG. 3, main upgrade logic 334 may carry out main upgrade scripts to record FAILED task identifiers of tasks associated with rebooting node 320 in the second operating system partition in database file 326.

Figure 6:
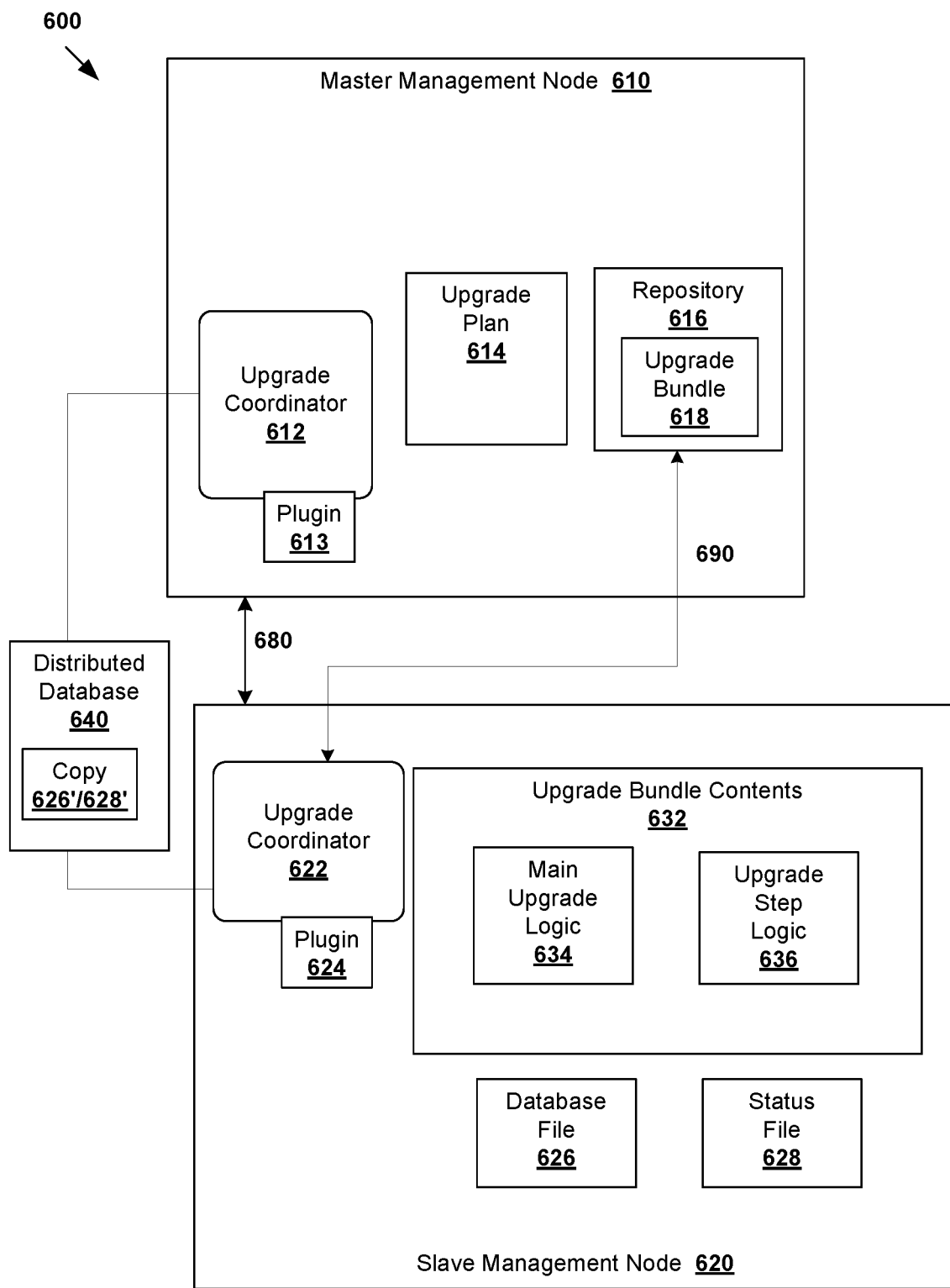
FIG. 6 is a schematic diagram illustrating a distributed upgrade operation involving a master management node and a slave management node in a virtualized computing environment, all arranged in accordance with some embodiments of the disclosure.

FIG. 6 is a schematic diagram illustrating a distributed upgrade operation involving master management node 610 and slave management node 620 in a virtualized computing environment 600. Although single slave management node 620 is illustrated for simplicity, those skilled in the art will recognize that two or more slave management node 620 may exist in virtualized computing environment 600.

In some embodiments, in conjunction with FIG. 1, master management node 610 may correspond to master manager 151 in virtualized computing environment 100. Slave management node 620 may correspond to any other managers (e.g., slave manager 153) in virtualized computing environment 100.

In some embodiments, master management node 610 includes upgrade coordinator 612. Upgrade coordinator 612 may be a self-contained Web application that orchestrates the upgrade process between different nodes in virtualized computing environment 600.

In some embodiments, in conjunction with FIG. 3, slave management node 620 includes upgrade coordinator 622 which includes upgrade coordinator plugin 624. In some embodiments, upgrade coordinator plugin 624 performs the same or similar operations of upgrade agent 324. In addition, upgrade coordinator 622 is configured to save a copy 626' of database file 626 to a distributed database 640 accessible by upgrade coordinator 612. According to copy 626' in distributed database 640, upgrade coordinator 612 may track the upgrade progress of all nodes in virtualized computing environment 600 and to display such progress on a user interface of master management node 610. In some embodiments, upgrade coordinator 612 may access upgrade coordinator plugin 624 based on credentials of slave manager 620 saved in distributed database 640 and issue commands to upgrade coordinator plugin 624 via channel 680. Channel 680 may be RAPI new API based.

In some embodiments, master management node 610 may generate upgrade plan 614 based on information collected in virtualized computing environment 600. In some embodiments, upgrade plan 614 may correspond to upgrade plan 157 described above and illustrated in FIG. 1. In some embodiments, master management node 610 may distribute tasks included in upgrade plan 614 to slave management node 620 via channel 680. In some embodiments, based on upgrade plan 614, upgrade coordinators 612 and 622 are upgraded first before upgrade coordinators 612 and 622 orchestrate the upgrade process for other components in virtualized computing environment 600.

In some embodiments, after the upgrades of upgrade coordinator 622 and hosts/edges/controllers in virtualized computing environment 600, upgrade coordinator plugin 624 is configured to upgrade slave management node 620, upgrade coordinator plugin 624 is configured to download upgrade bundle 618 from repository 616 through communication 690.

After upgrade bundle 618 is downloaded to slave manager 620, upgrade coordinator plugin 624 may also be configured to verify the authenticity/version of upgrade bundle 618. In addition, upgrade coordinator plugin 624 may extract upgrade bundle contents 632 from upgrade bundle 618.

In some embodiments, upgrade bundle contents 632 include, but not limited to, main upgrade logic 634 and upgrade step logic 636. In some embodiments, in conjunction with FIG. 3, main upgrade logic 634 may correspond to main upgrade logic 334 and perform the same or similar operations. Similarly, upgrade step logic 636 may correspond to upgrade step logic 336 and perform the same or similar operations.

In some embodiments, main upgrade logic 634 may carry out various main upgrade scripts and upgrade step logic 636 may carry out various upgrade step scripts, each associated with a specific upgrade step. In some embodiments, some example upgrade steps include, but not limited to, copying operating system image, configuration files and credentials of slave management node 620, saving copied operating system image, configuration files and credentials to a first operating system partition of slave management node 620, creating a second operating system partition of slave management node 620, installing a new operating system in the second operating system partition, rebooting slave management node 620 in the second operating system partition; and/or rebooting slave management node 620 in the first operating system partition (if rebooting in the second operating system partition fails). Similarly, upgrade step logic 636 may report intermediate progress messages by writing such progress to status file 628. In some embodiments, a copy 628' of status file 628 is saved in distributed database 640 accessible by upgrade coordinator 612.

In some embodiments, main upgrade logic 634 is configured to monitor the upgrade progress by collecting task identifier information for tasks of upgrade steps. In some embodiments, in response to FAILED task identifier associated with a specific task, main upgrade logic 634 may carry out main upgrade scripts to call upgrade step logic 636 to repeatedly carry out upgrade steps scripts associated with the specific task and continue to monitor the task identifier of the specific task. In some embodiments, main upgrade logic 634 may stop calling upgrade step logic 636 to carry out upgrade step scripts if task identifiers of all tasks are SUCCESS. In some embodiments, in response to a critical task with FAILED task identifier, main upgrade logic 634 may pause the upgrade and record the failed task in database file 626.

In some embodiments, in response to a failure of master management node 610 (e.g., failure to transmit a heartbeat message to other managers), any of other management node (e.g., slave management node 620) in virtualized computing environment 600 may perform a failover process to use upgrade coordinator 622 continuously to orchestrate the upgrade process for all components based on information in distributed database 640.

In some embodiments, master management node 610 may be also upgraded by upgrade coordinator plugin 613. Upgrade coordinator plugin 613 performs the same or similar operations as upgrade coordinator plugin 624, except master manager 610 may directly access upgrade bundle 618 from repository 616 hosted by master manager 610.

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, the computer system may implement processes performed by managers 151/153, controllers 161/163, edges 171/173 and hosts 110A/110B, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to perform distributed upgrade of a component of a data plane, a control plane, or a management plane in a virtualized computing environment including one or more components, comprising:

collecting, by a first upgrade coordinator of a first manager of the management plane, information associated with all the one or more components, wherein the first upgrade coordinator is a self-contained application that orchestrates upgrade processes of the one or more components;

preparing, by the first upgrade coordinator, an upgrade plan including a first set of tasks and a second set of tasks for upgrading the one or more components based on the collected information, wherein the first set of tasks is associated with the first manager and the second set of tasks is associated with a second manager of the management plane;

upgrading, by the first upgrade coordinator, the first upgrade coordinator based on the first set of tasks; and distributing, by the first upgrade coordinator, the first set of tasks to the first upgrade coordinator and the second set of tasks to a second upgrade coordinator of the second manager.

2. The method of claim 1, further comprising:

concurrently carrying out the first set of tasks with the first upgrade coordinator and the second set of tasks with the second upgrade coordinator to upgrade the one or more components of the data plane, the control plane, or the management plane.

3. The method of claim 1, wherein the upgrade plan is accessed by the first manager and the second manager via a Representational State Transfer (REST) new Application Programming Interface (API) channel.

4. The method of claim 2, further comprising recording status of the first set of tasks and the second set of tasks being carried out in a distributed database accessible by the first manager and the second manager.

5. A non-transitory computer-readable storage medium that includes a set of instructions which, in response to execution by a processor of a computer system, cause the processor to implement a method of performing distributed upgrade of a component of a data plane, a control plane, or a management plane in a virtualized computing environment including one or more components, wherein the method comprises:

collecting, by a first upgrade coordinator of a first manager of the management plane, information associated with all the one or more components, wherein the first upgrade coordinator is a self-contained application that orchestrates upgrade processes of the one or more components;

preparing, by the first upgrade coordinator, an upgrade plan including a first set of tasks and a second set of tasks for upgrading the one or more components based on the collected information, wherein the first set of tasks is associated with the first manager and the second set of tasks is associated with a second manager of the management plane;

upgrading, by the first upgrade coordinator, the first upgrade coordinator based on the first set of tasks; and distributing, by the first upgrade coordinator, the first set of tasks to the first upgrade coordinator and the second set of tasks to a second upgrade coordinator of the second manager.

6. The non-transitory computer-readable storage medium of claim 5, wherein the method further comprises concurrently carrying out the first set of tasks with the first upgrade coordinator and the second set of tasks with the second upgrade coordinator to upgrade the one or more components of the data plane, the control plane, or the management plane.

7. The non-transitory computer-readable storage medium of claim 5, wherein the upgrade plan is accessed by the first manager and the second manager via a Representational State Transfer (REST) new Application Programming Interface (API) channel.

8. The non-transitory computer-readable storage medium of claim 6, wherein the method further comprises recording status of the first set of tasks and the second set of tasks being carried out in a distributed database accessible by the first manager and the second manager.

9. A computer system configured to perform performing distributed upgrade of a component of a data plane, a control plane, or a management plane in a virtualized computing environment including one or more components, comprising:

a processor; and a non-transitory computer-readable medium having stored thereon instructions that, in response to execution by the processor, cause the processor to:

collect, by a first upgrade coordinator of a first manager of the management plane, information associated with all the one or more components, wherein the first upgrade coordinator is a self-contained application that orchestrates upgrade processes of the one or more components;

prepare, by the first upgrade coordinator, an upgrade plan including a first set of tasks and a second set of tasks for upgrading the one or more components based on the collected information, wherein the first set of tasks is associated with the first manager and the second set of tasks is associated with a second manager of the management plane;

upgrade, by the first upgrade coordinator, the first upgrade coordinator based on the first set of tasks; and distribute, by the first upgrade coordinator, the first set of tasks to the first upgrade coordinator and the second set of tasks to a second upgrade coordinator of the second manager.

10. The computer system of claim 9, wherein the non-transitory computer-readable medium having stored thereon additional instructions that, in response to execution by the processor, cause the processor to, concurrently carry out the first set of tasks with the first upgrade coordinator and the second set of tasks with the second upgrade coordinator to upgrade the one or more components of the data plane, the control plane, or the management plane.

11. The computer system of claim 9, further comprising a Representational State Transfer (REST) new Application Programming Interface (API) channel for the first manager and the second manager to access the upgrade plan.

12. The computer system of claim 10, wherein the non-transitory computer-readable medium having stored thereon additional instructions that, in response to execution by the processor, cause the processor to record status of the first set of tasks and the second set of tasks being carried out in a distributed database accessible by the first manager and the second manager.

* * * * *